March 7, 1961 SHELDON S. L. CHANG 2,973,926
CONTROL APPARATUS
Filed June 19, 1956 4 Sheets-Sheet 1

INVENTOR
SHELDON S. L. CHANG
BY
ATTORNEYS.

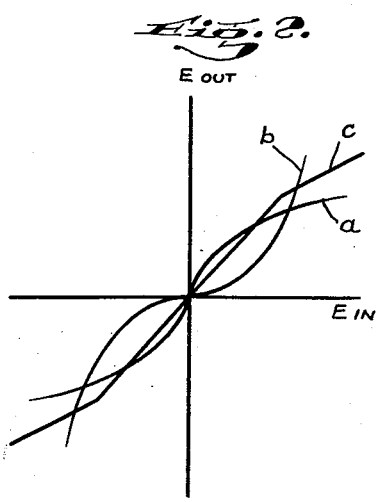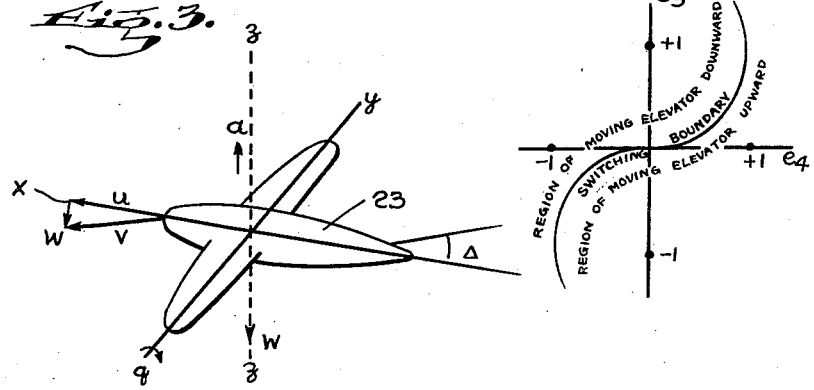

INVENTOR
SHELDON S. L. CHANG

March 7, 1961 SHELDON S. L. CHANG 2,973,926
CONTROL APPARATUS
Filed June 19, 1956 4 Sheets-Sheet 4

INVENTOR
SHELDON S. L. CHANG
BY Hubbell and Cohen
ATTORNEYS

# United States Patent Office 2,973,926
Patented Mar. 7, 1961

2,973,926
CONTROL APPARATUS

Sheldon S. L. Chang, 2440 Sedgwick Ave., Bronx, N.Y.

Filed June 19, 1956, Ser. No. 592,407

10 Claims. (Cl. 244—77)

This invention relates to an automatic control device and particularly to an automatic device for controlling an agent with limited power or speed of movement. Specifically, this invention relates to a control device for a moving body such as a ship, a missile or an aircraft, and more specifically, it relates to the optimum control of the pitch acceleration of an aircraft through a hydraulically actuated elevator.

The present application is directed to improvements in control devices of the type shown and described in my earlier filed copending application U.S. Serial No. 575,638.

In my earlier filed application, I disclosed a new and improved control device which stabilized the pitch acceleration of the aircraft. This device employed a non-linear summing actuator which was adapted to put out a signal to operate a hydraulic actuator of an aircraft to change the pitch acceleration in such a manner as to stabilize the latter in the least possible amount of time. This system by itself, however, included no means for stabilizing the pitch acceleration at any preselected value. In order to obviate this I disclosed in said earlier copending application separate means to compare the stabilized pitch acceleration with a preselected value and to alter the pitch acceleration so as to bring it to the desired value.

In the present application one object is to provide a new and improved control system which includes means for stabilizing the pitch acceleration of aircraft at a preselected value as an integral part of the system.

Another object of the present invention is the provision of means for controlling and stabilizing the altitude at which said aircraft is flying.

More generally, another object of the present invention is the provision of means for stabilizing the dynamic state of a moving body at a preselected value.

Still another general object of the present invention is the provision of means in apparatus for stabilizing the dynamic state of a moving body for controlling the course of said moving body at a preselected value.

The above and other objects, characteristics and features of the present invention will be more fully understood from the following description taken in connection with the accompanying illustrative drawings.

In the drawings:

Fig. 2 is a graphic representation of the characteristic curves of three non-linear elements employed in the present invention;

Fig. 3 is a schematic representation of an aircraft illustrating various reference axes and components of velocity employed in analyzing the present invention;

Figure 4A:
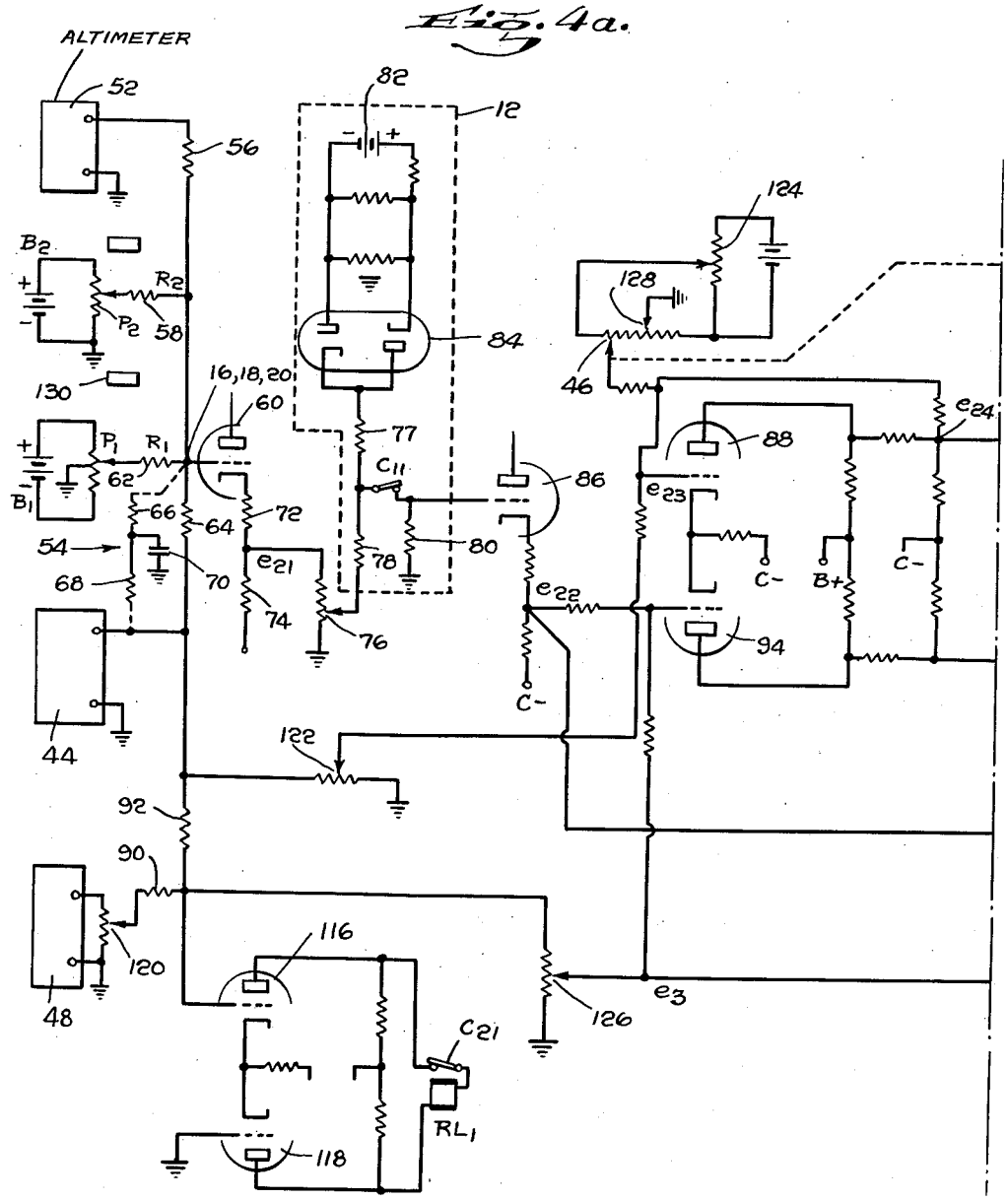
Figure 4B:
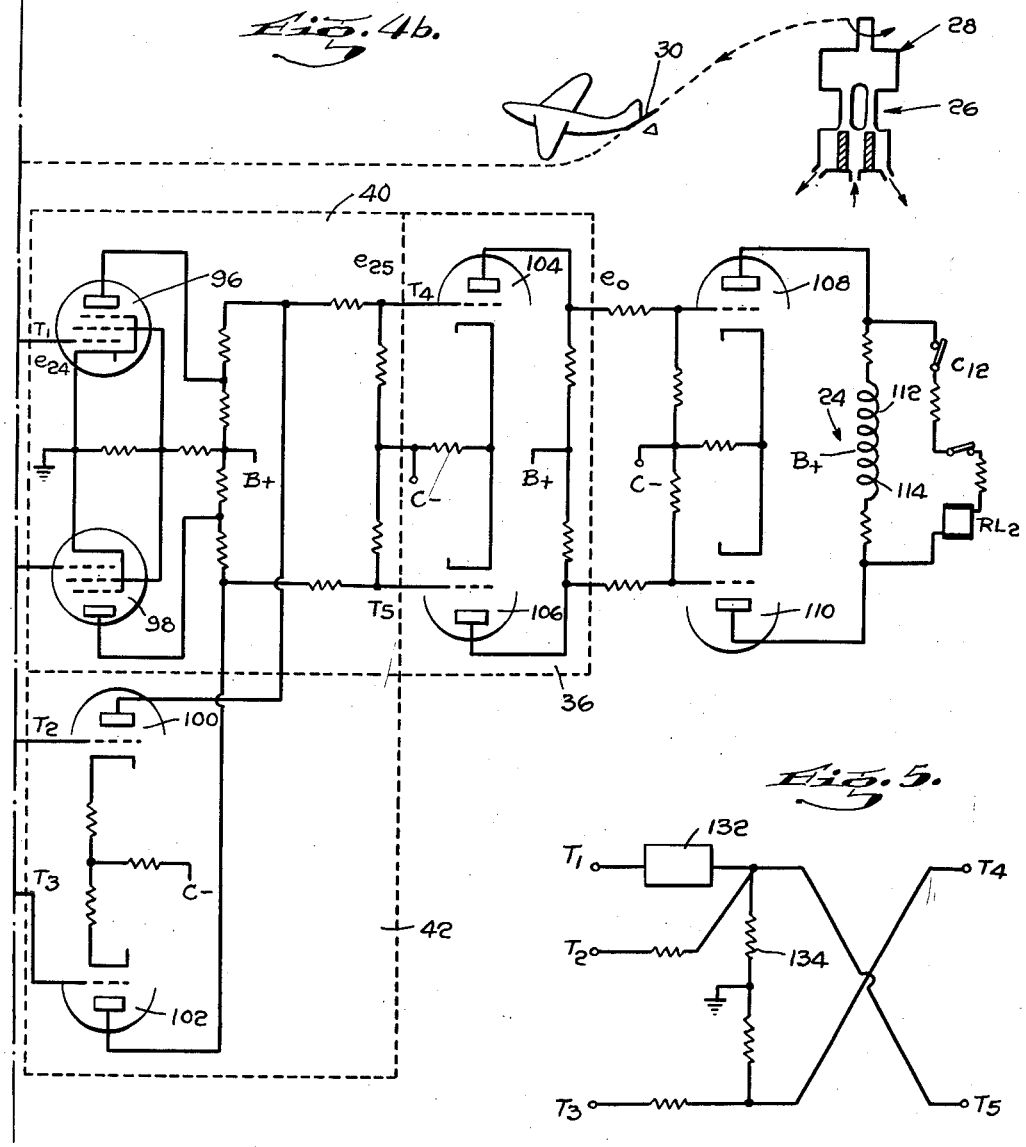
Figure 5:
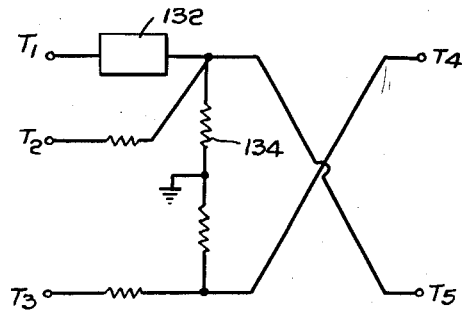

Figs. 4a and 4b when taken together diagrammatically illustrate a control apparatus embodying the present invention;

Fig. 5 is a fragmentary diagrammatic representation of an alternative form of one part of the control apparatus shown in Figs. 4a and 4b;

Fig. 6 is a graphic representation of the operating characteristics of the non-linear summing actuator in the present invention.

Referring first to Fig. 3, assuming that the wings and fuselage of aircraft are intersecting lines, the pitch direction of said aircraft is perpendicular to the plane defined by said intersecting lines, that is the pitch direction extends along the z axis. It is vertical if the aircraft is flying in a horizontal plane. It is at an angle to the vertical if the aircraft is not horizontal as when it turns or dives. It will be understood that throughout this specification when the term acceleration is used it means acceleration in the pitch direction and not in the direction of flight.

There are two basic proportionality constants, which will be represented by $k$ and $k'$, in the dynamics of the aircraft which are very important to controllers embodying this invention. If the elevator is in its neutral position, the aircraft may climb at a constant rate, but the acceleration is zero or the rate of climb does not change under the steady state condition. If the elevator is deflected upward by an angle $\Delta$, the aircraft will accelerate upward eventually at an acceleration $a$ which is approximately proportional to $\Delta$. Mathematically, the relationship may be expressed $$(\delta a)_s = k \delta \Delta \quad (1)$$

Here $\delta$ is standard mathematical symbol indicating variation. Suppose the elevator is originally at angle $\Delta_1$, and the corresponding acceleration under steady state condition is $a_1$. If the elevator moves to a new angle $\Delta_2$, the acceleration eventually steadies at a new value $a_2$. $(\delta a)_s$ means change in steady state value of $a$, or $a_2 - a_1$, and $\delta \Delta$ means $\Delta_2 - \Delta_1$. Equation 1 defines $k$.

However, immediately after a sudden upward movement of the elevator from $\Delta_1$ to $\Delta_2$, the immediate additional force acting on the aircraft is to push it downward. Let $a_2'$ denote the acceleration immediately after the elevator movement, then $$a_2' - a_1' = k'(\Delta_2 - \Delta_1) \quad (2)$$

Due to the immediate downward force, $a_2' - a_1$ is negative, and consequently $k'$ is negative. Hereinafter, $(\delta a)_i$ will indicate $a_2' - a_1$ or the initial change in acceleration, and $\delta a$ will indicate variation in acceleration at any time.

One novel aspect of the present controller is the formulation of two signals $e_3$ and $e_4$ to operate the elevator according to the dictation of these two signals. The significance of these signals and how they are derived may be explained as follows: If immediately after the elevator actuator is turned off to stop movement thereof, both $$\frac{da}{dt} = 0 \quad (3)$$

and $$\delta a - k \delta \Delta = 0 \quad (4)$$

the aircraft is stabilized. Equation 4 is the same as $(\delta a) = (\delta a)_s$. It means that the acceleration of the aircraft is now at its new steady state value. Equation 3 denotes that the acceleration is not changing. Both conditions are important. If $\delta a - k \delta \Delta \neq 0$, the aerodynamical forces are not balanced. Even if the acceleration is temporarily not changing, it eventually will seek its steady state value and cause transient oscillations. If $$\frac{da}{dt} \neq 0$$

even if the acceleration attains its new steady state value momentarily, it will continue to change and to seek balance again, and cause transient oscillations in the meantime.

However, the condition that $$\frac{da}{dt}=0$$

after the hydraulic actuator is turned off is not the same as $$\frac{da}{dt}=0$$

prior to turning off or reversing the hydraulic actuator. While the action of turning off or reversing the hydraulic actuator does not change the value of $\Delta$ at the instant the actuator is deenergized or reversed, it does change $d\Delta/dt$ at that instant from some definite positive value to zero or to some definite negative value. Of course, if $d\Delta/dt$ were negative at the time the actuator was deenergized or reversed, the reverse would be true. There is a corresponding sudden change in $da/dt$ such that $$\left(\delta\frac{da}{dt}\right)_i = k'\delta\frac{d\Delta}{dt} \quad (5)$$

where $k'$ is the negative proportionality constant in Equation 2 relating a sudden change in $a$ to a sudden change in $\Delta$. Accordingly, a signal $e_3$ will be employed such that $$e_3 = k_3\frac{d}{dt}[a+(-k')\Delta] \quad (6)$$

Bear in mind that $k'$ is always negative so $-k'$ is always positive when my novel control apparatus is employed to control the pitch acceleration of an aircraft or a missile.

In Equation 6, $k_3$ is a proportionality constant. The condition for turning off the hydraulic actuator is that $e_3=0$ instead of $$\frac{da}{dt}=0$$

for the following reasons:

(1) At the instant the hydraulic actuator is turned off or reversed, $e_3$ does not change in value, since $$(\delta e_3)_i = k_3\left\{\left(\delta\frac{da}{dt}\right)_i + (-k')\delta\frac{d\Delta}{dt}\right\} = 0$$

(2) After turning off the hydraulic actuator $$\frac{d\Delta}{dt}=0$$

Therefore, $$e_3 = k_3\frac{da}{dt}$$

(3) Since the value of $e_3$ is not changed by the action of turning off the hydraulic actuator, it remains zero after the actuator is off. Therefore $$\frac{da}{dt}=0$$

after the actuator is off. This is the desired condition.

The other signal $e_4$ is such that $$e_4 = k_4(\delta a - k\delta\Delta) \text{ or } e_4 = k_4\delta(a - k\Delta) \quad (7)$$

where $k_4$ is another proportionality constant.

Summarizing the above, to stabilize the aircraft $e_3$ and $e_4$ must both be zero.

In my earlier filed application in one form of the invention the two reference signals were derived from the displacement of the elevator from a given reference (usually horizontal) and from an accelerometer. However, in said copending application I also disclosed that a substantial amount of apparatus could be eliminated if a signal proportional to the output of a rate gyro were employed, in addition to the signals obtained from the elevator displacement and the accelerometer. To illustrate that the signal from the rate gyro when properly combined with the signal from the accelerometer will yield a signal equal to signal $e_3$ which is defined above in Equation 6, let it be assumed that the signal produced by a rate gyro may be expressed mathematically as $e_{20}=k_{20}q$, wherein $k_{20}$ is a proportionality constant. Further, let it be assumed that a signal $e_1$ is put out by the accelerometer. Now the signals $e_{20}$ and $e_1$ can be combined to yield a signal $e_3$ which is proportional to $uq-a$, wherein $u$ is the air speed of the aircraft, $q$ is the angular velocity in the pitch direction, and $a$ is the pitch acceleration (see Fig. 3).

It will now be demonstrated that the signal $uq-a$ is the same as $$\frac{d}{dt}[a+(-k')\Delta]$$

During flight, there are two forces acting in the pitch direction of the aircraft; a force $M(-k')\Delta$ which acts in the downward direction if $\Delta$ is positive, and a force $k_fw$ which acts in the upward direction. Suppose that both $\Delta$ and $w$ are initially zero. Immediately following a movement of the elevator upwards the only force acting on the aircraft is the small force $M(-k')\Delta$ since due to the inertia of the system it takes time for $w$ to increase. But as the direction of the aircraft fuselage is turned upward by the unbalanced torque, and the direction of the velocity has not followed, a component velocity $w$ develops (see Figure 3). Since the lift force $k_fw$ is much larger than $M(-k')\Delta$, the resultant is a lift force which accelerates the aircraft upwards according to Newton's second law:

$$k_fw - M(-k')\Delta = Ma \quad (8)$$

While I have explained the nature of the forces under the condition of upward acceleration, similar situation exists under all conditions and the above equation is true under all conditions. Equation 8 can be rewritten as:

$$a+(-k')\Delta = Z_1w \quad (9)$$

where $$Z_1 = \frac{k_f}{M}$$

Differentiating the above equation with respect to time, I obtain $$\frac{d}{dt}[a+(-k')\Delta] = Z_1\frac{dw}{dt} \quad (10)$$

It is very well known in kinematics that the total acceleration $a$ is related to $u$, $q$ and $dw/dt$ by the following equation:

$$a = uq - \frac{dw}{dt} \quad (11)$$

Cancelling $dw/dt$ from equations 10 and 11 the result is:

$$\frac{d}{dt}[a+(-k')\Delta] = Z_1(uq-a) \quad (12)$$

Equation 12 is what I set out to obtain.

Figure 1:
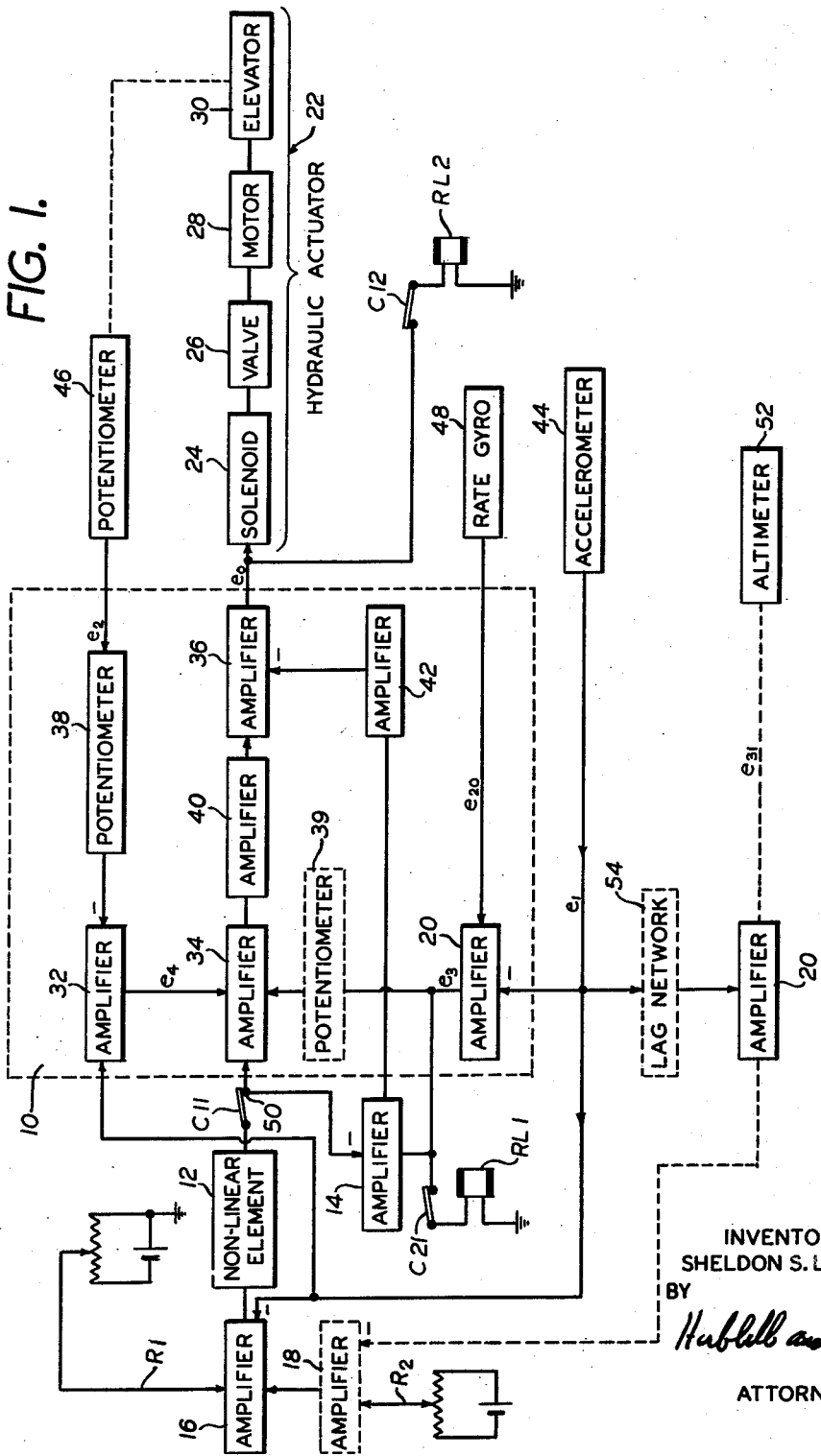
Fig. 1 is a block diagram graphically representing a control system embodying the present invention.

Fig. 1 is a diagrammatic representation of my invention which is more completely illustrated in Figs. 4a and 4b. Referring to Fig. 1, the device includes a stabilizing box 10, a non-linear element 12, interlocked relays $RL_1$ and $RL_2$, a summing amplifier 14, summing amplifiers 16, 18 and 20. The device controls a hydraulic actuator 22 which includes a solenoid 24, a hydraulic valve 26, a hydraulic motor 28, and an elevator 30. Stabilizing box 10 comprises summing amplifiers 32, 34 and 36, a potentiometer 38, a non-linear summing amplifier 40, and a linear amplifier 42. As indicated above, three electric signals are employed to control the apparatus for stabilizing the pitch acceleration of an aircraft. These signals are $e_1$ which is generated by an accelerometer 44, $e_2$ which is generated by a potentiometer 46 driven by the elevator 30, and $e_{20}$ produced by the rate gyro 48. The signal $e_1$ which is produced by the accelerometer 44 is proportional to the change in acceleration $\delta a$. Of course, the signal $e_1$ must be corrected for gravitational acceleration by a gyro system in a conventional manner. The signal $e_2$ as hereinbefore indicated is proportional to the change in the elevator deflection angle, $\delta \Delta$ from a preselected initial value. The signal $e_2$ may be varied prior to input to the summing amplifier 32 by the potentiometer 38 so that it is properly proportioned for operation by the stabilizing box 10. The initial values from which the changes are calculated may be any desired set of initial values but preferably and as is most convenient, the initial value of acceleration may be zero in which case the initial position of the elevator will be the neutral position. Signals proportional to $e_1$ and $e_2$ are supplied to the summing amplifier 32 and the output of the latter is a signal $e_4$ which is proportional to $\delta a - k\delta\Delta$. Furthermore, signals $e_1$ and $e_{20}$ may be supplied to summing amplifier 20 and combine therein to produce a signal $e_3$ which is porportional to $$\frac{da}{dt}+(-k')\frac{d\Delta}{dt}$$

Under normal conditions and as will be understood more fully hereinafter, both relays $RL_1$ and $RL_2$ are deenergized whereby to cause their back contacts $C_{11}$, $C_{12}$ and $C_{21}$ all to be closed. Moreover, under conditions where the acceleration is relatively stable and does not vary appreciably from a preselected value, the signal $e_3$ which is supplied to relay $RL_1$ over back contacts $C_{21}$ of relay $RL_2$ is insufficient to cause said relay to pick up, whereby the relay remains ordinarily released. Assuming that the acceleration is slightly different than the preselected value of acceleration which is determined by a reference voltage $R_1$, the signal $e_1$ and the signal $R_1$ will be combined by summing amplifier 16. The signal $e_1$ is subtracted from the signal $R_1$ by summing amplifier 16 and a small error signal is put out by said summing amplifier. This summing amplifier output is supplied to non-linear element 12, which non-linear element has a characteristic output shown by the curve $c$ of Fig. 2. Referring to curve $c$ it will be seen that the non-linear element operates relatively linearly for small inputs but tends to saturate at relatively large inputs whereby the output when operating beyond the points of saturation tends to increase at a slower rate than the input. During the relatively stable conditions being described at this time, the non-linear element 12 operates within its linear range. Assuming that the actual acceleration as measured by the accelerometer is slightly lower than the desired value as determined by the reference numeral $R_1$, the non-linear element 12 will put out a small positive voltage. This voltage is supplied simultaneously to the summing amplifiers 14 and 34. At summing amplifier 14 it is combined subtractively with the voltage $e_3$. The resulting output from summing amplifier 14 is supplied to amplifier 42 which amplifies the voltage and supplies it subtractively to summing amplifier 36. At the summing amplifier 34, it is combined with the signal $e_4$ and with a portion of the signal $e_3$ put out by the potentiometer 39. This resulting signal is supplied to the non-linear amplifier 40 whose characteristic will be described in more detail hereinafter. The output of the non-linear amplifier will be supplied to summing amplifier 36 which also is receiving the output from amplifier 42 and, accordingly, is acting to combine these two outputs in a subtractive manner. It is of importance to note that summing amplifier 14 operates to subtract the output of the non-linear element 12 from signal $e_3$ and that summing amplifier 36 operates to subtract the output of amplifier 42 from non-linear amplifier 40. Since there is a double reversal of the signal as it passes through summing amplifiers 14 and 36, the output of the non-linear amplifier 40 tends to be reinforced by the output of the amplifier 42 whereby to make the output of summing amplifier 36 positive.

The output signal $e_0$ of summing amplifier 36 is supplied to the winding of relay $RL_2$ and to the solenoid 24 of hydraulic actuator 22. The portion of signal $e_0$ being supplied to the relay $RL_2$ is insufficient to cause said relay to pick up, whereby the contact $C_{21}$ remains closed. However, the portion of the signal $e_0$ supplied to the solenoid 24 is sufficient to actuate the hydraulic actuator and thereby move the elevator 30 by means of the hydraulic valve and motor which are conventional. Since the signal $e_0$ is relatively small, the solenoid 24 will not operate to its fully energized position and, accordingly, the hydraulic system will operate at a relatively slow speed to move elevator 30. With the elevator 30 moving upward to increase the acceleration so as to bring it into direct comparison with the predetermined value of acceleration, the signal $e_1$ which is supplied by accelerometer 44 tends to increase and, accordingly, when this signal is combined with reference signal $R_1$ at summing amplifier 16 the output of the latter will decrease whereby to decrease the output of the amplifiers 40 and 42. This decrease will continue until the voltage $e_1$ is equal to the voltage $R_1$ at which time the input to the solenoid 24 will be zero and the elevator will become stationary with the aircraft stabilized at the predetermined value of acceleration. It should be noted that the voltages $e_3$ and $e_4$ will also be changed during the time that the elevator is being operated upwardly as described hereinbefore. These changes in voltages $e_3$ and $e_4$ will, when combined with the output of the non-linear element 12 at summing amplifiers 14 and 34, tend to assist in the stabilization of the aircraft in a minimum time.

Before explaining the operation of the apparatus shown in Fig. 1 under conditions of great variation in the pitch acceleration as compared with the reference or predetermined value of acceleration established by signal $R_1$, it is necessary to explain the combined operation and characteristic of the complex or non-linear summing actuator comprising non-linear amplifier 40, amplifier 42, summing amplifier 36 and voltage divider 39. Initially, it will suffice to say that the combined operation of these elements is substantially identical to the operation of the non-linear summing actuator shown and described in my earlier copending application. However, the means for obtaining the characteristic non-linear curve is entirely different in my present application and has considerable advantage over the earlier apparatus.

It is vital to my system that the output of summing amplifier 36 have a characteristic curve substantially the same as that shown in Fig. 6. It will be seen that the voltages $e_3$ and $e_4$ are supplied to the complex comprising the non-linear amplifier 40, amplifier 42, summing amplifiers 34 and 36 and voltage divider 39 and it is these two signals which actuate this complex. The signals $e_3$ and $e_4$ are combined by the above mentioned complex in such a way that if $e_4$ falls to the right of the switching boundary curve shown in Fig. 6, the complex will put out a positive voltage $e_0$ which will cause the elevator to deflect upwardly at maximum speed. If $e_4$ falls to the left of the switching boundary curve shown in Fig. 6, the complex will cause summing amplifier 36 to put out a negative signal $e_0$ which will cause the elevator to deflect downward at maximum speed. If $e_4$ and $e_3$ are zero, $e_0$ will be zero and the elevator will remain stationary. From the above and from a perusal of Fig. 6, it will be seen that the critical value of $e_4$, that is the value of $e_4$ which falls on the switching boundary curve, is a function of $e_3$. Accordingly, it may be stated mathematically that $e_4 = f(e_3)$ at the switching boundary.

The function $f(e_3)$ is a predetermined non-linear function depending on the dynamics of the system. Its significance is this: for any positive value of $e_3$ there is one value of $e_4$ such that if these are the corresponding initial values of the system and the elevator is moving upward, $e_3$ and $e_4$ will eventually decrease to zero simultaneously. I have denoted this value of $e_4$ as $f(e_3)$, since it depends on the value of $e_3$. The same is true for negative values of $e_3$ and $e_4$ and the elevator moving downward.

Suppose $e_4$ is smaller than $f(e_3)$, that means the elevator is deflected too far upward. Signal $e_0$ becomes negative which actuates the elevator to move downward until $e_4$ is slightly larger than $f(e_3)$. $e_0$ then becomes positive until both $e_3$ and $e_4$ are approximately zero, at which time the valve will be returned to its neutral position. As I explained earlier, when $e_3$ and $e_4$ vanish simultaneously, the aircraft is stabilized. The reverse steps take place if $e_4$ is larger than $f(e_3)$ at the outset.

Figure 6 illustrates a typical $f(e_3)$ function for aircraft control. For any value of $e_3$ the curve gives a value of $e_4$ which is the function $f(e_3)$ referred to above. If $e_4 - f(e_3) > 0$, the pair of values $e_3$, $e_4$ will fall to the right of the curve and $e_0$ will become positive to move the elevator upward. If $e_4 - f(e_3) < 0$, the pair of values $e_3$, $e_4$ will fall to the left of the curve, and $e_0$ will become negative to move the elevator downward. If $e_4 = f(e_3)$, and both $e_3$, $e_4$ are positive, temporarily the signal $e_0$ will be zero. However, as $e_3$ is positive, this means that the acceleration is increasing, and consequently $e_4$ is increasing until $e_4 - f(e_3)$ is slightly positive. $e_0$ will then become a positive signal actuating the elevator upward until both $e_3$ and $e_4$ vanish. The reverse is true if $e_4 = f(e_3)$ and both $e_3$, $e_4$ are negative.

The curve illustrated in Fig. 6 may be described parametrically by the following equations:

In the first quadrant:

$$\frac{e_3}{k'_3} = +1 - \frac{e^{\zeta T}}{\cos x} \cos(x + T\sqrt{1-\zeta^2})$$

$$\frac{e_4}{k'_4} = -\left[2\zeta - \frac{Z_1(-k')}{[k+(-k')]\omega_n} - \frac{e^{\zeta T}}{\cos x} \sin(x + \Phi + T\sqrt{1-\zeta^2})\right]$$

In the third quadrant:

$$\frac{e_3}{k'_3} = -1 + \frac{e^{\zeta T}}{\cos x} \cos(x + T\sqrt{1-\zeta^2})$$

$$\frac{e_4}{k'_4} = +\left[2\zeta - \frac{Z_1(-k')}{[k+(-k')]\omega_n} - \frac{e^{\zeta T}}{\cos x} \sin(x + \Phi + T\sqrt{1-\zeta^2})\right]$$

In the above equations, $k'_3$ and $k'_4$ are proportionality constants and their values are arbitrarily determined by the characteristics of the non-linear complex and the associated circuitry. Specifically, $k'_3$ is defined by the following equation:

$$e_3 = k'_3 \cdot \frac{\frac{d}{dt}(a + (-k')\Delta)}{[k+(-k')]\Omega}$$

and $k'_4$ is defined by the equation:

$$e_4 = k'_4 \cdot \frac{(a - k\Delta)\omega_n}{[k+(-k')]\Omega}$$

In the equations defining the constants $k'_3$ and $k'_4$, the constants $k$ and $-k'$ have been defined heretofore. $\Omega$ is the maximum angular speed in radians per second at which the elevator 30 can be moved. $Z_1$, $\zeta$ and $\omega_n$ are constants which depend upon the dynamical system and will be defined hereinafter. $\Phi$ and $X$ are constant angles determined by $Z_1$, $\zeta$, $\omega_n$, $k$ and $-k'$ in a manner to be illustrated hereinafter. $T$ is the variable parameter of the curve. For each value of $T$ there is one and only one value for each of $e_3$ and $e_4$ in the first quadrant, and one and only one value for each of $e_3$ and $e_4$ in the third quadrant. Since $T$ may vary from zero to some definite value determined by the damping effect of the entire system and the magnitude of the disturbances normally expected to be encountered, a complete curve as shown in Fig. 6 is obtained. For the purposes of analysis, let it be assumed that the definite or absolute maximum value of $T$ is $\pi$.

The constants $Z_1$, $\zeta$ and $\omega_n$ are defined as follows: Referring to Fig. 3, the aerodynamical body or aircraft is pointing in the $u$ direction while its instantaneous velocity $V$ is in the $v$ direction, there is a component $W$ of the velocity $V$ in the pitch direction. As is well known to persons skilled in the art of aerodynamics, a force $F_z$ acting on the aircraft in the $z$ or vertical direction is proportional to the vertical or pitch component of velocity, that is $F_z$ is proportional to $W$. This relationship may be expressed mathematically as follows:

$$F_z = K_f W$$

$Z_1$ is defined by the following relationship:

$$Z_1 = \frac{K_f}{M}$$

wherein $M$ is the mass of the aircraft.

To define $\zeta$ and $\omega_n$, let it be assumed that the pilot manually operates the elevator to an extreme position, which operation causes a large disturbance. Let it further be assumed that the elevator comes to rest in the extreme position. With the stated conditions the acceleration of the aircraft in the pitch direction will oscillate about a steady state value and this acceleration may be described by the following equation:

$$a = k\Delta + Ae^{-\zeta\omega_n t} \sin[(\sqrt{1-\zeta^2})\omega_n t + \Theta]$$

In the above equation $\zeta$ and $\omega_n$ are constants which depend upon the air density and the forward velocity $U$ and $A$ and $\Theta$ are constants which depend upon $d\Delta/dt$.

The constant angles $\Phi$ and $X$ may be defined by the following equations:

$$\Phi = \sin^{-1}\zeta \qquad 0° < \Phi < 90°$$

$$\tan X = \tan \Phi - \frac{Z_1(-k')}{[k+(-k')]\omega_n \cos \Phi}$$

An analysis of the above equations will illustrate that $X$ is slightly smaller than $\Phi$.

The curve which the non-linear element follows as illustrated in Fig. 6, is the ideal curve for the present system. However, an analysis of this curve will illustrate that it follows approximately the arcs of two circles which are symmetrical about the origin of the curve and, if desired, such a characteristic may be given to the non-linear element. A non-linear element having the circular characteristic will operate satisfactorily in a system of the type described herein. Moreover, other variations may be imparted to the non-linear element's characteristic curve without departing materially from the spirit and scope of the present invention. Furthermore, when a device different from an aircraft is employed, such as for instance, a ship, the non-linear element will have a different curve depending upon the hydrodynamic conditions but the analysis of the curve will follow an analysis substantially identical to the analysis presented hereinbefore.

There are several manners in which the complex made up of amplifiers 40 and 42, summing amplifiers 34 and 36 and voltage divider 39 can be arranged so that $e_0$ will be determined in accordance with the curve shown in Fig. 6. One manner of accomplishing this is to provide amplifier 40 with a linear characteristic and provide amplifier 42 with a non-linear characteristic similar to that shown in curve $a$ of Fig. 2. This curve illustrates a saturated type of output. Another manner of accomplishing the desired output for $e_0$ is to arrange amplifier 42 to be linear in characteristic and have amplifier 40 operate in a non-linear manner, the non-linear characteristic being shown by curve $b$ in Fig. 2, which characteristic tends to show that the output increases more rapidly as the input increases. A third possible manner of accomplishing the desired result is to provide amplifier 40 with a characteristic similar to that shown in curve $b$ of Fig. 2 and to provide amplifier 42 with a characteristic similar to that shown in curve $a$ of Fig. 2.

Although any of the suggested means for obtaining an $e_0$ in accordance with the curve shown in Fig. 6 will operate satisfactorily, I presently prefer to make amplifier 40 operate in a non-linear manner in accordance with curve $b$ of Fig. 2 and make amplifier 42 a linear amplifier. I prefer this arrangement since amplifiers 40 and 42 form part of a continuous linear control system for small inputs and disturbances as has been described hereinbefore. When operating as a linear system, I have found that by having amplifier 40 operate with a characteristic similar to the curve $b$ of Fig. 2, the incremental gain of the amplifier is low at small inputs and is high at large inputs. This is desirable because it permits the amplifier to operate so as to rapidly reverse elevator movements upon large input (that is upon large variations in acceleration from the norm), yet to put out a small signal which will not operate the solenoid to its extreme position when there is only a small variation in acceleration from the desired value. This latter point is extremely important in view of the fact that it reduces the tendency of the system when operating in response to small discrepancies to oscillate by tending to overcompensate.

I shall proceed to explain how the complex operates to produce an $e_0$ in accordance with the curve of Fig. 6 regardless of the arrangement. For the first arrangement in which amplifier 40 is linear and amplifier 42 has a non-linear characteristic as shown in curve $a$ of Fig. 2, a signal $e_3$ supplied to amplifier 42 will saturate when its value is large and as a result it would take a proportionately large $e_4$ to neutralize $e_3$ when the magnitudes of both are large. However, for an increase in $e_3$ the required increase in $e_4$ is always positive. This can be compensated by combining a part of $e_3$ with $e_4$ through a voltage divider 39.

With the latter arrangement when amplifier 42 saturates an increase in $e_3$ will cause a positive increase in output from amplifier 40 which is more than the increase in output from amplifier 42. As a result the output from summing amplifier 36 will be positive instead of negative and a reduction in $e_4$ will compensate for this positive voltage. This will cause the switching boundary as shown in Fig. 6 to bend towards the vertical axis for large signals of $e_3$ and $e_4$.

In the second arrangement the amplifier 42 is linear and the amplifier 40 has a non-linear characteristic as shown in curve $b$ of Fig. 2. A slight increase in $e_4$ will cause a very small output from amplifier 40 when $e_4$ is small but will cause a relatively large output from amplifier 40 when $e_4$ is large. Therefore the amount of voltage $e_4$ required to neutralize $e_3$ is proportionately large when the magnitudes of both are small and is proportionately small when the magnitudes of both are large. The voltage divider 39 introduces a portion of $e_3$ to $e_4$ and combines the two signals at summing amplifier 34. When both signals are small the amplification of amplifier 40 is small and this effect is not significant. However, when both signals are large the amplification of amplifier 40 becomes large enough so that the portion of the signal $e_3$ which is being amplified by amplifier 40 is more than sufficient to neutralize the output from amplifier 42. When this happens an increase in $e_3$ will cause the output from summing amplifier 36 to be more positive rather than negative. To neutralize this effect a decrease in $e_4$ will be required and this accounts for the bending of the switching boundary towards the vertical axis for large inputs.

In the third case an amplifier 40 having the characteristic of curve $b$ and an amplifier 42 having a characteristic of curve $a$ are used. The operation is entirely similar to the two above cases and a detailed description is believed to be unnecessary.

Assuming that the aircraft or other movable body encounters great turbulence so as to rapidly and violently change the pitch acceleration thereof in a positive direction, the signal $e_{20}$ produced by the rate gyro 48 will rise very rapidly. At the same time the signal $e_1$ will not change very rapidly due to the inertia of the system, that is, the acceleration of the aircraft will remain substantially constant at the time turbulence is encountered and will only change at a later time. Accordingly, the signal $e_3$ which is dependent upon the difference between signals $e_{20}$ and $e_1$ as summed by summing amplifier 20 will be very large. Since the signal $e_3$ is large, a substantial current will flow over back contact $C_{21}$ of relay $RL_2$ and through the relay winding of relay $RL_1$ whereby to energize the relay $RL_1$ to cause it to pick up and open its back contacts $C_{11}$ and $C_{12}$. The effects of relay $RL_1$ opening contacts $C_{11}$ and $C_{12}$ will be to disconnect relay $RL_2$ from the circuit whereby to prevent its energization and further to disconnect the non-linear element 12 and the summing amplifiers 16 and 18 from the circuit. This, of course, will take the reference voltage $R_1$ out of circuit and the system for the time being will have no reference. Accordingly at this time the only signals which are being supplied to the complex are signals derived from $e_3$ and $e_4$. At the time that the turbulence is encountered at which time the rate of change of acceleration is large but the change in acceleration is small, the elevator is stationary whereby rendering $e_2$ zero. With $e_2$ being zero signal $e_4$ which is derived from $e_1 - e_2$ will be relatively small but signal $e_3$ which is proportional to the difference between $e_{20}$ and $e_1$ will be relatively large since the rate of change of acceleration is large. Accordingly, if the values of $e_3$ and $e_4$ were plotted on the graph shown in Fig. 6, we would find that since $e_3$ has a large positive value and $e_4$ is relatively small the point determined by the values of $e_3$ and $e_4$ would fall to the left of the switching boundary whereby to cause $e_0$ to be relatively large and negative whereby to actuate the solenoid so as to operate the elevator downwardly at its maximum speed. Accordingly, a negative $e_2$ signal will start to be put out by the potentiometer 46 and this signal will increase as the elevator continues to move downwardly. With the elevator being moved downwardly it will tend to decrease the acceleration. But since it will take some time for the effect of the elevator to decrease the acceleration and since the turbulence has acted to increase the acceleration, the voltage $e_4$ which is the difference between $e_1$ and $e_2$ as summed by summing amplifier 32 will rise at a rapid rate. Furthermore, due to the inertia of the system, $e_{20}$ will during this time tend to remain somewhat constant at a high value whereby to maintain $e_3$ relatively large. Accordingly, $e_4$ will increase until $e_3$ and $e_4$ can be plotted as being on the switching boundary of the curve in Fig. 6. At this point as has been described previously, $e_0$ will first become zero and then become positive causing the elevator to move upwards at maximum speed. $e_3$ and $e_4$ will take on decreasing and related values as shown as the switching boundary of Fig. 6 until they become zero simultaneously. At that point the aircraft is stabilized.

However, since the relay $RL_1$ has been energized throughout this period thereby taking the reference voltage $R_1$ out of circuit, the system may stabilize at some value of acceleration other than the desired value as determined by the reference voltage $R_1$. At the time that the system does stabilize (at any value) signal $e_3$ becomes zero and, accordingly, relay $RL_1$ becomes deenergized and releases whereby to close contacts $C_{11}$ and $C_{12}$. If the discrepancy between the stabilized value of acceleration and the desired value of acceleration is relatively small, the system will operate in a manner identical to the manner in which it operates when encountering small disturbances to restabilize at the predetermined value of acceleration.

However, in the event that the discrepancy is large, then the reference voltage $R_1$ when combined subtractively with $e_1$ by summing amplifier 16, will tend to cause the latter summing amplifier to put out a substantial voltage. The polarity of this voltage will be determined by the value at which the system had initially stabilized itself and will be positive if the stabilized value of acceleration is lower than the reference value and will be negative if the stabilized value of stabilization is higher than the reference value. Let it be assumed for the purposes of explanation that the output of summing amplifier is positive. In any case the output of summing amplifier 16 will be operated on by non-linear element 12. The positive output of the summing amplifier will be operated on by non-linear element 12 which will put out a signal that is somewhat smaller than the output of amplifier 16 due to the saturable characteristic of the non-linear element 12. This output will be amplified by amplifiers 40 and 42 and the polarity of the outputs of both amplifiers will be additive due to the double reversal of polarity as the signal passes through summing amplifiers 14 and 36. Accordingly, the signal $e_0$ will be relatively large and positive and will cause a relatively large current to flow through relay winding $RL_2$ thereby causing that relay to pick up and open contact $C_{21}$. With contacts $C_{21}$ opened, relay $RL_1$ is taken out of the circuit and is thereby prevented from removing the reference voltage $R_1$ from the circuit. Moreover, with signal $e_0$ relatively large and positive, it will cause the stabilizer or elevator to move upwardly at maximum speed whereby to rapidly increase signals $e_{20}$ and $e_2$ and to relatively slowly increase signal $e_1$. Accordingly, signal $e_3$ will rapidly become a large positive value and signal $e_4$ will rapidly become a relatively large negative signal. However, at summing amplifier 34 signal $e_4$ is combined with the output of the non-linear element which is positive whereby to tend to reduce the output signal of summing amplifier 34. Moreover, at summing amplifier 14 signal $e_3$ which is positive is combined with the output of the non-linear element 12 subtractively and since the signal $e_{20}$ is increasing it tends to reduce the negative output of the summing amplifier 14. With the output of the summing amplifiers 14 and 34 being reduced, $e_0$ will become small and relay $RL_2$ will become deenergized and reclose contact $C_{21}$. However, signal $e_3$ at this time will be large and positive because the output signal $e_{20}$ is large and positive and with contact $C_{21}$ reclosed, relay $RL_1$ will become reenergized whereby to open contacts $C_{11}$ and $C_{12}$. It should be noted that the time for this to occur depends on the magnitude of the output from the non-linear element 12 because a large output from non-linear element 12 will require large values of $e_3$ and $e_4$ to neutralize its effect on $e_0$, and the larger are the values of $e_3$ and $e_4$, the longer the time required to effect neutralization.

When contact $C_{21}$ closes relay $RL_1$ picks up and thereby opens $C_{11}$ and $C_{12}$. $e_3$ is large and positive and $e_4$ is large and negative. Referring to Fig. 6, the point defined by the values of voltages $e_3$ and $e_4$ will be to the left of the switching boundary and $e_0$ will instantly become large and negative. This will cause the elevator to move downward at maximum speed. Signal $e_2$ will therefor rapidly decrease in magnitude. Due to the inertia of the aircraft, the rate of change of acceleration will not be much affected at first. Therefore $e_4$ will first become zero and then positive while $e_3$ remains positive until the values of $e_3$ and $e_4$ come to a point on the switching boundary. At that time $e_0$ will first become zero and then positive again and the elevator will then move upward again until both $e_3$ and $e_4$ are reduced to zero.

If the initial period of acceleration of moving the elevator upward is longer, the final acceleration will be at a higher level. The non-linear element is designed such that when the system is finally stabilized the value of acceleration is approximately equal to $R_1$ and the non-linear element takes the form of curve $c$ of Fig. 2.

Assuming that the pilot wishes to change the value of acceleration of the aircraft, he will operate the potentiometer which supplies the reference signal $R_1$ as by operating a lever or in any other standard manner. If the change is a small change, then the system will operate to stabilize in the new value in the same manner as when the aircraft encounters a small disturbance. If the change is a large change the system will operate in exactly the same manner as it operates after the initial stabilizing step when it encounters a large disturbance. Since these operations have been described above, a repetition at this points is deemed unnecessary.

As was stated in the objects of the present invention, if desired my novel control system can be adapted to control the altitude or course of the moving body as well as to control the dynamic state thereof. More specifically, when applied to an aircraft my novel control system can simultaneously control and stabilize the pitch acceleration of the aircraft and also the altitude of the aircraft. This is accomplished by producing a signal $e_{31}$ which is proportional to the altitude of the aircraft. This signal may be derived in any suitable manner such as by a potentiometer connected to an altimeter 52 or by radar actuated apparatus or in any other suitable manner. At the outset it is believed necessary to point out that the altitude of an aircraft changes slowly and since my apparatus is extremely sensitive the variation in altitude from a preselected value of altitude will always be small. The advantage of this will become clear as the discussion progresses.

In order to control the altitude of the aircraft the signal $e_{31}$ is supplied to the summing amplifier 18 where it is subtracted from a reference voltage $R_2$ which is proportional to the preselected value of altitude. If the actual altitude and the preselected value of altitude are the same there will be no output from the summing amplifier 18 and, accordingly, the system will operate to stabilize the pitch acceleration as discussed hereinbefore. However, assuming that the aircraft tends to move downwardly due to its encountering a low pressure area or a down draft, then $e_{31}$ will be less than $R_2$. Accordingly, summing amplifier 18 will put out a positive voltage, which voltage will combine with voltage $R_1$ and actuate summing amplifier 16 to put out a positive voltage. Since $e_1$ at this time is equal to $R_1$, the only voltage being put out by summing amplifier 16 is the voltage difference between $R_2$ and $e_{31}$. The non-linear element will respond linearly to this voltage as it is relatively low and the positive output of the non-linear element will produce a positive $e_0$ in the same manner as a positive output from summing amplifier 16 due to a difference in pitch acceleration produces a positive $e_0$. Accordingly, the solenoid will be partially actuated to move the elevator 30 upward a small amount so as to cause the aircraft to move upwardly and thereby compensate for the down draft. It is to be noted that any signals produced at summing amplifiers 16 and 18 cannot possibly compensate for one another whereby to stabilize at an incorrect altitude and at an incorrect pitch acceleration. While it is true that it is conceivable that an aircraft might be at too high an altitude and being accelerated downwardly at such a rate that the two errors will tend to cancel each other out, this must be an unstable condition and as the aircraft tends to continue to move downwardly due to its downward acceleration, the unstable condition will bring about different error signals which will cause the apparatus to stabilize at the proper pitch acceleration and the proper altitude.

It will be obvious to those skilled in the art that by introducing the altitude control into the system, the altitude feedback can cause oscillation if uncompensated. This tendency can be obviated either by inserting a lead network between summing amplifiers 16 and 18 or by employing a negative feedback which is roughly proportional to the velocity in the pitch direction. The latter means is diagrammatically illustrated in Fig. 1 and is designated by the reference numeral 54. By using this lag network 54 or an integral network the acceleration signal from the accelerometer is converted into a signal approximately proportional to the pitch speed of the aircraft. This type of compensating means is well known in the art and further description is deemed unnecessary.

Figs. 4a and 4b together show a preferred arrangement of my improved control device. The altitude measuring instrument 52 puts out a negative voltage proportional to the actual altitude while the reference altitude is simply the setting of a potentiometer $P_2$ which puts out a positive voltage. The two voltages are summed through resistances 56 and 58 and applied to the grid of cathode follower 60. The acceleration reference input $R_1$ is obtained from a center tapped potentiometer $P_1$ which is normally set at zero. The accelerometer puts out a negative voltage proportional to the acceleration in pitch direction. The two voltages are summed through resistances 62 and 64 and applied to the grid of cathode follower 60. Resistances 66, 68 and condenser 70 constitute the lag network 54 for compensating the altitude feedback loop.

With zero grid voltage, the cathode voltage of the cathode follower 60 is normally positive. The resistances 72 and 74 are so proportioned that a voltage $e_{21}$ is zero when the grid voltage of tube 60 is zero. Resistances 77, 78 and 80, battery 82 and duo-diode 84 constitute the non-linear element 12. When $e_{21}$ is small, the tube 84 is not conducting, and resistances 77 and 78 alone form a voltage dividing circuit. When $e_{21}$ is large, resistance 80 and tube 84 shunt off part of the current, and the portion of voltage across resistance 78 is a smaller fraction of the total voltage. A cathode follower 86 isolates the non-linear circuit from its output voltage $e_{22}$.

Potentiometer 46 puts out a voltage $e_{22}$ proportional to $\delta\Delta$, and is combined with the accelerometer voltage to form the grid voltage $e_{23}$ of a tube 88. The voltage $e_{23}$ is proportional but opposite to $e_4$.

Rate gyro 48 puts out a voltage proportional to the pitch angular velocity $q$. It is combined with the accelerometer voltage through resistances 90 and 92 to obtain a voltage $e_3$ which is proportional to $uq-a$ or $$\frac{d}{dt}(a-k'\Delta)$$

The amplifier circuit of the twin triode tube 88—94 is equivalent to the summing amplifier 34 of Fig. 1. The voltage $e_{22}$ and part of voltage $e_3$ are applied to the grid of tube 94.

The output voltage $e_{24}$ of amplifier 34 is applied to highly negatively biased amplifier 40 comprising remote cut-off pentode tubes 96 and 98. It has the concave amplification characteristics as required and as is shown in curve $b$ of Fig. 2. The voltages $e_{22}$ and $e_{23}$ are applied to linear amplifier 42 comprising twin triode tubes 100 and 102. The outputs from amplifiers 40 and 42 are combined at the input of summing amplifier 36, comprising twin triodes 104 and 106. Its output is applied to a power amplifier 108—110 which passes a current through solenoid 24 having two portions 112 and 114 to actuate the hydraulic valve 26. The output from the power amplifier is also applied to relay coil $RL_2$.

The voltage $e_3$ is amplified by twin triodes 116—118 and applied to the relay coil $RL_1$.

Potentiometers 120, 76, 122, 124 and 126, and ground adjustment 128 of potentiometer 46 are provided for adjusting the controller to changing flight conditions, the predominant factors of which are the forward speed of the aircraft and air density. These adjustments may be positioned by instrument servos.

Under normal operating condition, both relay coils are not sufficiently energized and are therefore released to cause all the contacts $C_{11}$, $C_{12}$ and $C_{21}$ to be closed.

Assuming that the actual altitude of the aircraft is slightly lower than the desired altitude, a positive error voltage is applied to the grid of tube 60 resulting in a positive voltage $e_{22}$. As $e_{22}$ is applied to grid of tube 94, a positive voltage $e_{24}$ and consequently a negative voltage $e_{25}$ results. As $e_{22}$ is also applied to the grid of tube 100, this makes voltage $e_{25}$ even more negative. Accordingly, the voltage $e_0$ is positive, and causes more current to flow through solenoid part 112 and less current to flow through solenoid part 114. The unbalanced current causes the elevator 30 to move slowly upward. The aircraft rises until the altitude error is compensated for. The error signal vanishes and the aircraft remains at the desired altitude.

Suppose that the aircraft encounters violent atmospheric turbulence which sends its heading downward. A negative pitch angular velocity $q$ and a negative rate of change of acceleration $da/dt$ will result. Rate gyro 48 puts out a negative signal and thus causes signal $e_3$ to be negative. Relay coil $RL_1$ operates and opens contacts $C_{11}$ and $C_{12}$. Negative signal $e_3$ causes voltage $e_{25}$ to be also negative and $e_0$ to be large and positive. A large unbalanced current flows through solenoid part 112, causing elevator 30 to move upward at maximum speed.

The upward movement of elevator 30 and the change in acceleration causes $e_{23}$ to be positive and $e_{24}$ to be negative. When $e_{24}$ reaches sufficient magnitude, it makes $e_{25}$ positive and $e_0$ negative. A large unbalanced current flows through solenoid part 114, causing elevator 30 to move downward at maximum speed, until both $e_3$ and $e_{23}$ vanish. The aircraft is stabilized at a negative value of acceleration. Relay coil $RL_1$ is then deenergized, closing contacts $C_{11}$ and $C_{12}$.

If the difference between the preferred value of acceleration and the value at which the aircraft is stabilized is small in magnitude, minor adjustment will take place as described earlier. If it is large, the situation is the same as if the pilot wishes to accelerate his aircraft upward, and the operation will be described in the paragraphs below.

Suppose that the pilot wishes his plane to accelerate upward. He pulls a control lever 130 which moves the potentiometer $P_1$ to a new position and sends a positive voltage signal $R_1$ to the grid of tube 60. A positive voltage $e_{22}$ will result and this causes in sequential order a positive voltage $e_{24}$, a negative voltage $e_{25}$, a large positive voltage $e_0$, a large unbalanced current flowing through solenoid part 112 and sufficient current to energize relay $RL_2$ to open contact $C_{21}$.

The elevator 30 moves upward at maximum speed causing the aircraft heading to turn upward. A positive pitch angular velocity $q$ and then a positive acceleration develop. However, as it takes time for the acceleration to reach appreciable value, $e_{23}$ and $e_3$ are both positive. The effect is to cause voltage $e_{25}$ to become less negative and then zero. At the moment $e_{25}$ is close enough to zero, $RL_2$ deenergizes, closing contact $C_{21}$. The interval between the instant $R_1$ is first applied to tube 60 causing $RL_2$ to be energized and the instant $R_1$ is neutralized by large enough values of $e_{23}$ and $e_{22}$, causing $RL_2$ to be deenergized, increases with the magnitude of $R_1$.

As soon as contact $C_{21}$ closes, relay $RL_1$ becomes energized, opening contacts $C_{11}$ and $C_{12}$. The voltage $e_{22}$ vanishes. However, as both $e_{23}$ and $e_3$ are now sufficiently large and positive, $e_{24}$ is negative, $e_{25}$ is positive, and $e_0$ is large and negative. A large unbalanced current flows through solenoid part 114 causing the elevator 30 to move downward at maximum speed.

While the elevator moves downward, the angular momentum of the aircraft causes its heading to change continuously upward and its upward acceleration to increase. Both factors make $e_{23}$ first reduce to zero and then to become negative. As negative signal $e_{23}$ gains sufficient magnitude it causes $e_{24}$, $e_{25}$, and $e_0$ to reverse sign. Once again a large unbalanced current flows through solenoid part 112 causing the elevator to move upward at maximum speed until both $e_3$ and $e_{23}$ vanish. Relay $RL_1$ deenergizes closing contacts $C_{11}$ and $C_{12}$, and the aircraft has reached the desired level of upward acceleration.

There are many variations to the circuitry of Fig. 4 which do not differ in principle. For instance, a piece of thyrite 132 may be used in place of the non-linear amplifier 40, as shown in Fig. 5. The assembly shown in Fig. 5 can be used in place of amplifiers 40 and 42 with terminals $T_1$ to $T_5$ connected at the corresponding places. As thyrite is more conductive for larger signal, the output voltage across resistor 134 has the required concave characteristics shown as curve $b$ in Fig. 2. While the thyrite circuitry appears simpler, a higher input level would be required which tends to complicate the rest of the circuitry.

Magnetic amplifiers and transistor amplifiers may be used instead of the vacuum tube amplifiers. Radio guidance systems may furnish the reference input signals instead of the potentiometers $P_1$ and $P_2$. In missile steering applications, the controller may be used for positioning the jet or rocket motor instead of the elevator. While the missile steering application is a two dimensional problem, two separate units may be used. Alternatively, one unit may be used together with a direction allocating unit to allocate the output motion in the same direction as the error. The two alternatives correspond to Cartesian coordinates and polar coordinates in geometry and are well known in the art.

Although I have herein shown and described several forms of the present invention, it will be understood that various changes and modifications may be made therein within the scope of the appended claims without departing from the spirit and scope of this invention.

Having now described my invention, what I claim as new and desire to secure by Letters Patent, is:

1. Control means for controlling the dynamic state of a body, said control means comprising a controlling agent, means for changing the condition of said controlling agent, a summing actuator, an error sensing means, an interrupting means, means for preventing the operation of said interrupting means, and means for producing feedback signals which are substantially proportional to linear combinations of changes in the dynamic state of said body and the condition of said controlling agent and time derivatives thereof, said error sensing means being adapted to produce an actuating error signal which increases in magnitude as the difference of said dynamic state of said body increases from the desired value of said dynamic state, said means connecting said error sensing means and said means for producing feedback signals to said summing actuator for supplying said actuating error signal and said feedback signals to said summing actuator to cause the latter to put out an output signal in accordance with a predetermined relation between said actuating error signal and said feedback signals, means connecting said summing actuator to said means for changing said condition of said controlling agent for supplying said output signal from said summing actuator to said means for changing said condition of said controlling agent to operate said last mentioned means in accordance with said predetermined relationship between said actuating error signal and said feedback signals, means including said interrupting means for preventing said actuating error signal from being supplied to said summing actuator when said interrupting means is operative whereby to cause said summing actuator to change the condition of said controlling agent only in accordance with said feedback signals, means including preventing means for operating said interrupting means effective only when said preventing means is not operating and said feedback signals are above a predetermined value, and means including said interrupting means for operating said preventing means effective only when said interrupting means is not operating and a combination of said error signal and said feedback signals are above a predetermined amount.

2. Control means according to claim 1, in which under steady state conditions a change in the dynamic state of said body ($\delta a_s$) is equal to a change in the condition of said controlling agent ($\delta \Delta$) times a first constant ($k$; $\delta a_s = k\delta\Delta$) and when there is a sudden change in the condition of said controlling agent, the change in the dynamic state of said body ($\delta a_1$) is equal to said sudden change in the condition of said controlling agent ($\delta \Delta$) times a second constant ($k'$; $\delta a_1 = k'\delta\Delta$), means for producing a first electric signal ($e_4$) substantially proportional to the difference between the change in the dynamic state of said body and said first constant times the change in condition of said controlling agent ($e_4 \propto (\delta a - k\delta\Delta)$), means for producing a second electric signal ($e_3$) substantially proportional to the time rate of change of the difference between the dynamic state of said body and the condition of said controlling agent times said second constant $$\left(e_3 \propto \frac{d}{dt}(a - k'\Delta)\right)$$

said means for producing feedback signals comprising said means for producing said first electric signal and said means for producing said second electric signal.

3. Control means according to claim 1, wherein said means for operating said preventing means includes said summing actuator, whereby said combination of said error signal and said feedback signals is said output signal of said summing actuator.

4. Control means according to claim 2, wherein said means for operating said preventing means includes said summing actuator, whereby said combination of said error signal and said feedback signals is said output signal of said summing actuator.

5. Control means according to claim 4, in which said non-linear summing actuator comprises a first summing means, a second summing means, a non-linear amplifier in which the output rises more rapidly than the input, a substantially linear amplifier, and a third summing means, said first summing means being adapted to produce a third signal ($e_5$) substantially proportional to said first signal ($e_4$) plus said actuating error signal times a third proportionality constant, means for supplying said third signal ($e_5$) to said non-linear amplifier, said second summing means being adapted to produce a fourth signal ($e_6$) substantially proportional to said second signal ($e_3$) minus said actuating error signal times a fourth proportionality constant, means for supplying said fourth signal ($e_6$) to said linear amplifier, means for connecting said non-linear and linear amplifiers to said third summing means, said third summing means being adapted to produce an output signal ($e_0$) dependent on the difference in outputs from said non-linear amplifier and said linear amplifier, and means for supplying said output sginal ($e_0$) from said third summing means to said preventing means and said means for changing the condition of said controlling agent for at times operating said last two mentioned means.

6. Control means for controlling the pitch acceleration of an aircraft having a movable elevator and means for moving said elevator; said control means comprising a non-linear summing actuator, an error sensing means, an interrupting means, means for preventing the operation of said interrupting means, and means for producing feedback signals which are substantially proportional to linear combinations of changes in the pitch acceleration of said aircraft and the condition of said elevator and time derivatives thereof, said error sensing means being adapted to produce an actuating error signal which increases in magnitude as the difference between the actual pitch acceleration and a predetermined value thereof increases, means for supplying said actuating error signal and said feedback signals to said summing actuator to cause the latter to put out an output signal in accordance with a predetermined relation between said actuating error signal and said feedback signals, said non-linear summing actuator being adapted to put out an output signal in accordance with a predetermined relationship between said actuating error signal and said feedback signals, means for supplying said output signal from said non-linear summing actuator to said means for moving said elevator to actuate the latter in accordance with said predetermined relationship, means including said interrupting means for preventing said actuating error signal from being supplied to said summing actuator when said interrupting means operates whereby to cause said summing actuator to change the condition of said elevator only in accordance with said feedback signals, means including said preventing means for operating said interrupting means effective only when said preventing means is not operating and said feedback signals are above a predetermined value, and means including said interrupting means for operating said preventing means effective only when said interrupting means is not operating and a combination of said error signal and said feedback signals are above a predetermined amount.

7. Control means for controlling the dynamic state of a body, said control means comprising a controlling agent, means for changing the condition of said controlling agent, a non-linear summing actuator, an error sensing means, an interrupting means, means for preventing the operation of said interrupting means, and means for producing feedback signals which are substantailly proportional to linear combinations of changes in the dynamic state of said body and the condition of said controlling agent and time derivatives thereof, said error sensing means being adapted to produce an actuating error signal which increases in magnitude as the difference of said dynamic state of said body increases from the desired value of said dynamic state, means connecting said error sensing means and said feedback signals producing means to said non-linear summing actuator for supplying said non-linear summing actuator with said actuating error signal and said feedback signals, means including said non-linear summing actuator for operating said means for changing said condition of said controlling agent in accordance with said predetermined relationship between said actuating error signal and said feedback signals, said means for supplying said actuating error signal to said non-linear summing actuator including said interrupting means and being effective when said interrupting means is operative to prevent said actuating error signal from being supplied to said non-linear summing actuator whereby to cause said non-linear summing actuator to change the condition of said controlling agent only in accordance with said feedback signals, means including said preventing means for operating said interrupting means effective only when said preventing means is not operating and said feedback signals are above a predetermined value, and means including said interrupting means for operating said preventing means effective only when said interrupting means is not operating and a combination of said error signal and said feedback signals are above a predetermined amount.

8. Means for controlling the pitch acceleration of an aircraft having a movable elevator for changing the pitch acceleration and means for moving said elevator, the relationship between the pitch acceleration ($a_s$) and the angular position of the elevator ($\Delta$) under steady state condition being expressed as $\delta a_s = k \delta \Delta$ wherein $k$ is a first proportionality constant and the relationship between pitch acceleration ($a_l$) and the angular position of the elevator ($\Delta$) under condition of sudden change being expressed as $\delta a_l = k' \delta \Delta$ wherein $k'$ is a second proportionality constant and is negative, means for producing a first electric signal ($e_3$) in accordance with the equation $$e_3 = k_3 \frac{d}{dt}(a + (-k')\Delta)$$

wherein $k_3$ is a proportionality constant, means for producing a second electric signal ($e_4$) in accordance with the equation $$e_4 = k_4 \delta(a - k\Delta)$$

wherein $k_4$ is another proportionality constant, an error sensing means adapted to produce an actuating error signal which increases as the difference between the actual pitch acceleration and a predetermined value thereof increases, a non-linear summing actuator, first and second relays, means for energizing each of said relays including a normally closed contact of the other of said relays, circuit means connecting said error sensing means to said non-linear summing actuator including a second normally closed contact of said first relay for supplying said actuating error signal to said non-linear summing actuator, circuit means for operating said first relay to open its contacts including the said contact in series with said second relay and effective only when said first signal ($e_3$) is greater than a predetermined value, circuit means for operating said second relay to open its contact including said contact in series with said first relay and effective only when said non-linear summing actuator is putting out a voltage of a predetermined value, said non-linear summing actuator being adapted to put out voltages below said given value when said actuating error signal is small, said non-linear summing actuator being further adapted to put out a third signal above a given value to actuate said means for moving said elevator when said actuating error signal is large and said means connecting said error sensing means to said non-linear summing actuator is open at said second contact of said first relay except when said first and second signals are proportioned in accordance with the below defined characteristic curve, said third signal being of one polarity when a point defined by value of $e_3$ and $e_4$ plotted on cartesian coordinates is to the right of the characteristic curve of said non-linear device plotted on the same coordinate and said third signal being of opposite polarity when said point is to the left of said characteristic curve, said characteristic curve being described parametrically as follows. In the first quadrant:

$$\frac{e_3}{k'_3} = +1 - \frac{e^{\zeta T}}{\cos x} \cos(x + T\sqrt{1-\zeta^2})$$

$$\frac{e_4}{k'_4} = -\left[2\zeta - \frac{Z_1(-k')}{[k+(-k')]\omega_n}\right] + \frac{e^{\zeta T}}{\cos x} \sin(x + \Phi + T\sqrt{1-\zeta^2})$$

In the third quadrant:

$$\frac{e_3}{k'_3} = -1 + \frac{e^{\zeta T}}{\cos x} \cos(x + T\sqrt{1-\zeta^2})$$

$$\frac{e_4}{k'_4} = +\left[2\zeta - \frac{Z_1(-k')}{[k+(-k')]\omega_n}\right] - \frac{e^{\zeta T}}{\cos x} \sin(x + \Phi + T\sqrt{1-\zeta^2})$$

wherein $k'_3$ is a proportionality constant defined by the equation $$e_3 = k'_3 \cdot \frac{\frac{d}{dt}(a - (-k')\Delta)}{[k+(-k')]\Omega}$$

and $k'_4$ is a proportionality constant defined by the equation $$e_4 = k'_4 \cdot \frac{(a - k\Delta)\omega_n}{[k+(-k')]\Omega}$$

$\Omega$ is the maximum possible value of $d\Delta/dt$; wherein $Z_1$ is defined by the equation $$Z_1 = \frac{k_f}{M}$$

and M is the mass of the aircraft and $k_f$ is the proportionality constant defined by the equation $$F_z = k_f w$$

and $F_z$ is the force acting upon the aircraft in the pitch direction and $w$ is the velocity of the aircraft in the pitch direction; wherein $\zeta$ and $\omega_n$ are constants depending upon flight condition, $\Phi = \sin^{-1}\zeta$, $$\tan X = \tan \Phi - \frac{Z_1(-k')}{[k+k']\omega_n \cos \Phi}$$

and T is the variable parameter defining the characteristic curve; said third signal actuating said elevator moving means to reduce $e_3$ and $e_4$ in accordance with said characteristic curve until both $e_3$ and $e_4$ approximate zero whereat said non-linear summing device discontinues putting out said third signal and the pitch acceleration of said aircraft is stabilized.

9. The method of stabilizing the dynamic state of a moving body having means for changing said dynamic state at a predetermined value, comprising the steps of comparing the actual dynamic state with said predetermined value thereof, actuating said changing means to stabilize said dynamic state at said predetermined value when the difference between said actual and predetermined values is below a given amount, discontinuing the comparison between said actual and predetermined values when the initial difference therebetween is above said given amount, stabilizing the dynamic state of said body at any value after the comparison thereof with said predetermined value has been discontinued, then recomparing the value of said dynamic state with said predetermined value, and then preventing discontinuance of said comparison until the rate of change of said dynamic state achieves a given value dependent upon the initial difference in value between said dynamic state and said predetermined value of said dynamic state.

10. The method of stabilizing the pitch acceleration of an aircraft at a predetermined value, comprising the steps of comparing the actual value of said pitch acceleration with said predetermined value, stabilizing at said predetermined value provided the difference between said actual and said predetermined value is below a given amount, discontinuing the comparison between said actual and said predetermined values when the initial difference therebetween is above said given amount, stabilizing the pitch acceleration at any value after the comparison thereof with said predetermined value has been discontinued, then recomparing the value of the actual pitch acceleration with said predetermined value, and then preventing discontinuance of said comparison until the rate of change of said pitch acceleration achieves a given value dependent upon the initial difference in value between said pitch acceleration and said predetermined value of said pitch acceleration.

References Cited in the file of this patent

UNITED STATES PATENTS

| | | |
|---|---|---|
| 2,627,384 | Esval | Feb. 3, 1953 |
| 2,816,724 | Snodgrass | Dec. 17, 1957 |